(12) United States Patent
Perisic et al.

(10) Patent No.: US 6,978,267 B2
(45) Date of Patent: Dec. 20, 2005

(54) SYSTEM AND METHOD FOR PERSONALIZED INFORMATION RETRIEVAL BASED ON USER EXPERTISE

(75) Inventors: Igor Perisic, San Mateo, CA (US); Christian Posse, Seattle, WA (US)

(73) Assignee: Entopia, Inc., Redwood Shores, CA (US)

( * ) Notice: Subject to any disclaimer, the term of this patent is extended or adjusted under 35 U.S.C. 154(b) by 0 days.

(21) Appl. No.: 10/971,830

(22) Filed: Oct. 21, 2004

(65) Prior Publication Data

US 2005/0055346 A1    Mar. 10, 2005

Related U.S. Application Data

(63) Continuation of application No. 10/172,165, filed on Jun. 14, 2002, now Pat. No. 6,892,198.

(51) Int. Cl.[7] ............................................. G06F 17/30
(52) U.S. Cl. ............................. 707/5; 707/10; 705/10; 709/217
(58) Field of Search ..................... 707/5, 10; 706/15; 709/217; 705/10

(56) References Cited

U.S. PATENT DOCUMENTS 6,327,590 B1 *   12/2001   Chidlovskii et al. ........... 707/5
6,460,036 B1 *   10/2002   Herz ........................... 707/10

* cited by examiner

Primary Examiner—Charles Rones
(74) Attorney, Agent, or Firm—Morgan, Lewis & Bockius LLP

(57) ABSTRACT

A search request is received at an information retrieval system from a searcher. The search request preferably contains at least one search term and a user identifier. A plurality of objects are then searched based on the at least one search term. At least one located object is found from the plurality of objects. The at least one located object is associated with the search term(s). An intrinsic score based on the search term(s) is subsequently calculated for each located object. The intrinsic score is then adjusted to an adjusted score based on the difference between a creator expertise of a creator of the at least one located object and/or a contributor expertise of a contributor to the at least one located object, and a searcher expertise of the searcher.

37 Claims, 5 Drawing Sheets

SYSTEM AND METHOD FOR PERSONALIZED INFORMATION RETRIEVAL BASED ON USER EXPERTISE

This is a continuation application of U.S. patent Ser. No. 10/172,165 filed Jun. 14, 2002, U.S. Pat. No. 6,892,198, issued May 10, 2005 entitled SYSTEM AND METHOD FOR PERSONALIZED INFORMATION RETRIEVAL BASED ON USER EXPERTISE, hereby incorporated by reference in its entirety.

BACKGROUND OF THE INVENTION

1. Field of the Invention

The present invention relates generally to information retrieval, and more particularly to a system and method for adjusting search results based on the relative expertise between a searcher and the creator/s and/or contributor/s of a document.

2. Description of Related Art

With the proliferation of corporate networks and the Internet, an ever increasing amount of information is being made available in electronic form. Such information includes documents, graphics, video, audio, or the like. While corporate information is typically well indexed and stored on corporate databases within a corporate network, information on the Internet is generally highly disorganized.

Searchers looking for information typically make use of an information retrieval system. In corporate networks, such an information retrieval system typically consists of document management software, such as Applicant's QUANTUM™ suite, or iManage Inc's INFORITE™ or WORKSITE™ products. Information retrieval from the internet, however, is typically undertaken using a search engine, such as YAHOO™ or GOOGLE™.

Generally speaking, these information retrieval systems extract keywords from each document in a network. Such keywords typically contain no semantic or syntactic information. For each document, each keyword is then indexed into a searchable data structure with a link back to the document itself. To search the network, a user supplies the information retrieval system with a query containing one or more search terms, which may be separated by Boolean operators, such as "AND" or "OR." These search terms can be further expanded through the use of a Thesaurus. In response to the query, which might have been expanded, the information retrieval system attempts to locate information, such as documents, that match the searcher supplied (or expanded) keywords. In doing so, the information retrieval system searches through its databases to locate documents that contain at least one keyword that matches one of the search terms in the query (or its expanded version). The information retrieval system then presents the searcher with a list of document records for the documents located. The list is typically sorted based on document ranking, where each document is ranked according to the number of keyword to search term matches in that document relative to those for the other located documents. An example of a search engine that uses such a technique, where document relevancy is based solely on the content of the document, is INTELISEEK™. However, most documents retrieved in response to such a query have been found to be irrelevant.

In an attempt to improve precision, a number of advanced information retrieval techniques have been developed. These techniques include syntactic processing, natural language processing, semantic processing, or the like. Details of such techniques can be found in U.S. Pat. Nos. 5,933,822; 6,182,068; 6,311,194; and 6,199,067, all of which are incorporated herein by reference.

However, even these advanced information retrieval techniques have not been able to reach the level of precision required by today's corporations. In fact, a recent survey found that forty four percent of users say that they are frustrated with search engine results. See *Internet Usage High, Satisfaction low: Web Navigation Frustrate Many Consumers,* Berrier Associates—sponsored by Realnames Corporation (April 2000).

In addition, other advanced techniques have also proven to lack adequate precision. For example, GOOGLE™ and WISENUT™ rank document relevancy as a function of a network of links pointing to the document, while methods based on Salton's work (such as ORACLE™ text) rank document relevancy as a function of the number of relevant documents within the repository.

This lack of precision is at least partially caused by current information retrieval systems not taking the personal profiles of the document creator, searcher, and any contributors into account. In other words, when trying to assess the relevancy of documents within a network, most information retrieval systems ignore the searcher that performs the query, i.e., most information retrieval systems adopt a one-fit-all approach. For example, when a neurologist and a high school student both perform a search for "brain AND scan," an identical list of located documents is presented to both the neurologist and the high school student. However, the neurologist is interested in high level documents containing detailed descriptions of brain scanning techniques, while the student is only interested in basic information on brain scans for a school project. As can be seen, a document query that does not take the searcher into account can retrieve irrelevant and imprecise results.

Moreover, not only should the profession of a searcher affect a search result, but also the expertise of the searcher within the search domain. For example, a medical doctor that is a recognized world expert would certainly assign different relevancy scores to the returned documents than say an intern. This means that information retrieval systems should be highly dynamic and consider the current expertise level of the searcher and/or creator/s at the time of the query.

In addition, the current lack of precision is at least partially caused by the treatment of documents as static entities. Current information retrieval techniques typically do not take into account the dynamic nature of documents. For example, after creation, documents may be commented on, printed, viewed, copied, etc. To this end, document relevancy should consider the activity around a document.

Therefore, a need exists in the art for a system and method for retrieving information that can yield a significant improvement in precision over that attainable through conventional information retrieval systems. Moreover, such a system and method should preferably personalize information retrieval based on user expertise.

BRIEF SUMMARY OF THE INVENTION

According to the invention there is provided a method for personalizing information retrieval. A search request is received at an information retrieval system from a searcher. The search request preferably contains at least one search term and a user identifier. A plurality of objects are then searched based on the search term(s). Objects preferably include: content objects, such as documents, comments, or folders; source objects; people objects, such as experts, peers, or workgroups; or the like. At least one located object is found from the plurality of objects. Each located object is associated with the search term(s). An intrinsic score based on the search term(s) is subsequently calculated for each located object. The intrinsic score is based on the search term(s). The intrinsic score is then adjusted to an adjusted score based on the difference between a creator expertise of the creator of the located object and/or a contributor expertise of a contributor/s to the located object, and a searcher expertise of the searcher.

To make this adjustment, objects associated with the searcher are located using the unique user identifier. The searcher expertise is then ascertained based on the search terms and the objects associated with the searcher. The creator expertise and/or the contributor/s expertise is determined for each located object. The intrinsic score, with the exception of people related searches, is then raised to the adjusted score for each located object having a creator expertise higher than the searcher expertise. Alternatively, the intrinsic score, with the exception of people related searches, is then lowered to the adjusted score for each located object having a creator expertise that is lower than the searcher expertise. For people related searches, creator expertise significantly above or below the searcher expertise negatively affect the intrinsic score of the located object. A list is then transmitted to the searcher to be displayed, where the list is based on the search request and the adjusted scores.

Accordingly, at the time of the query, the expertise of the searcher is taken into consideration in relation to the expertise of both the creator/s and contributor/s. Therefore, the present invention yields a significant improvement in precision over that attainable through conventional information retrieval systems.

BRIEF DESCRIPTION OF THE DRAWINGS

Additional features of the invention will be more readily apparent from the following detailed description and appended claims when taken in conjunction with the drawings, in which:

Figure 1:
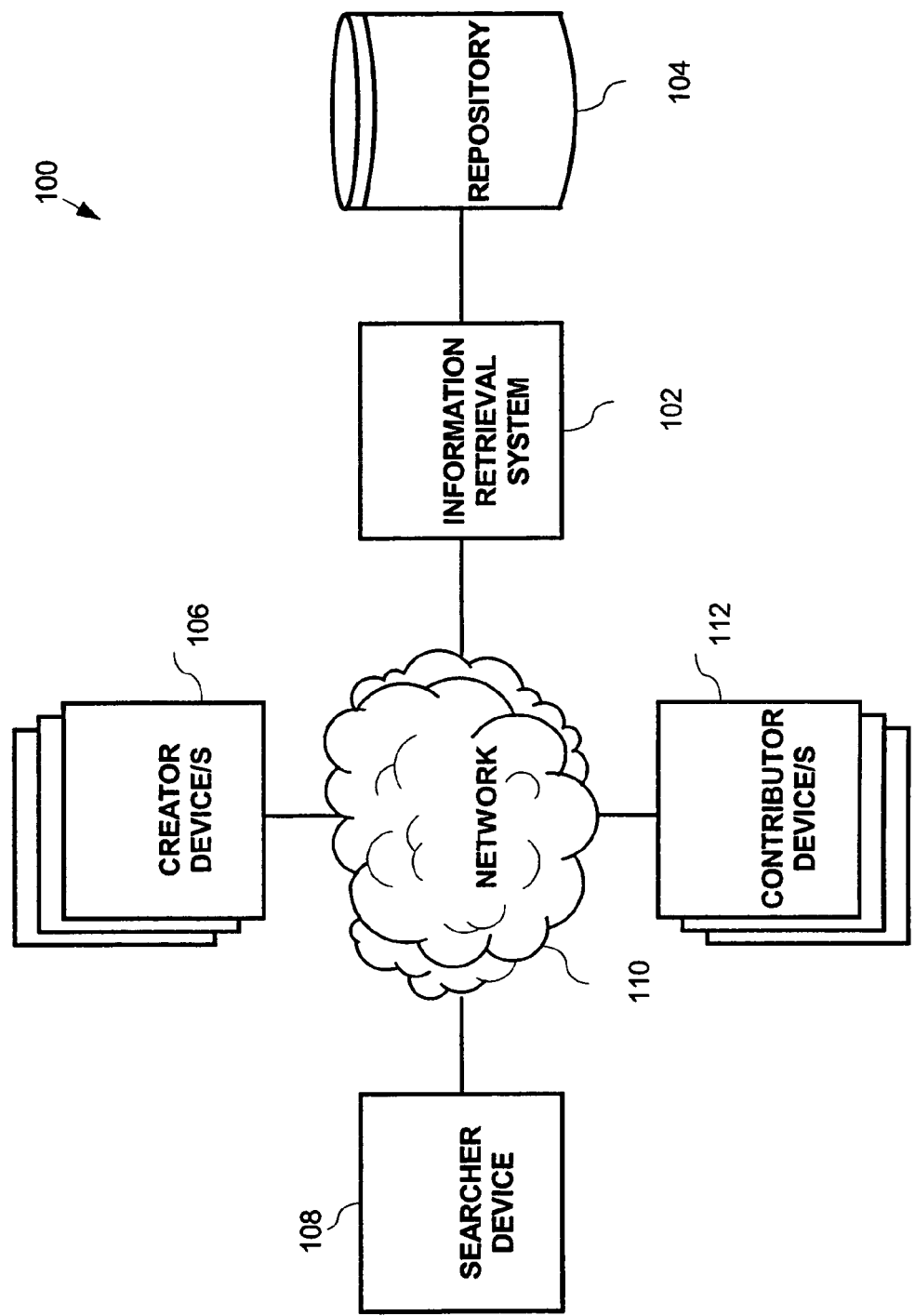
FIG. 1 is a block diagram of a system architecture for a system for personalizing information retrieval.

Like reference numerals refer to corresponding parts throughout the several views of the drawings. For ease of reference, the first number/s of any reference numeral generally indicates the number of the figure where the reference numeral can be found. For example, 112 can be found on FIG. 1, and 324 can be found on FIG. 3.

DETAILED DESCRIPTION OF THE INVENTION

FIG. 1 is a block diagram of a system architecture 100 for a system for personalizing information retrieval. An information retrieval system 102 is coupled to a repository 104 and to a network 110. Also coupled to the network 110 are a searcher device 108, one or more creator device/s 106, and one or more contributor device/s 112. Searcher device 108, creator device/s 106, contributor device/s 112, and information retrieval system 102 are all computing devices, such as clients, servers, or the like. The network is preferably a Local Area Network (LAN), but alternatively may be any network, such as the Internet. It should be appreciated that although searcher device 108, creator device/s 106, contributor device/s 112, and information retrieval system 102 are shown as distinct entities, they may be combined into one or more devices. Further details of the searcher device 108, creator device/s 106, contributor device/s 112, and information retrieval system 102 can be found below in relation to FIGS. 2–5.

The repository 104 is any storage device/s that is capable of storing data, such as a hard disk drive, magnetic media drive, or the like. The repository 104 is preferably contained within the information retrieval system 102, but is shown as a separate compnent for ease of explaination. Alternatively, the repository 104 may be dispersed throughout a network, and may even be located within the searcher device 108, creator device/s 106, and/or contributor device/s 112.

Each creator device 106 is a computing device operated by a creator who creates one or more documents. Each contributor device 112 is a computing device operated by a contributor who contributes to a document by, for example, adding to, commenting on, viewing, or otherwise accessing documents created by a creators. The searcher device 108 is a computing device operated by a searcher who is conducting a search for relevant documents created by the creator/s or contributed to by the contributor/s. The searcher, creator/s, and contributor/s are not limited to the above described roles and may take on any role at different times. Also, the searcher, creator/s, and contributor/s may browse the repository 104 without the use of the information retrieval system 102.

Figure 2:
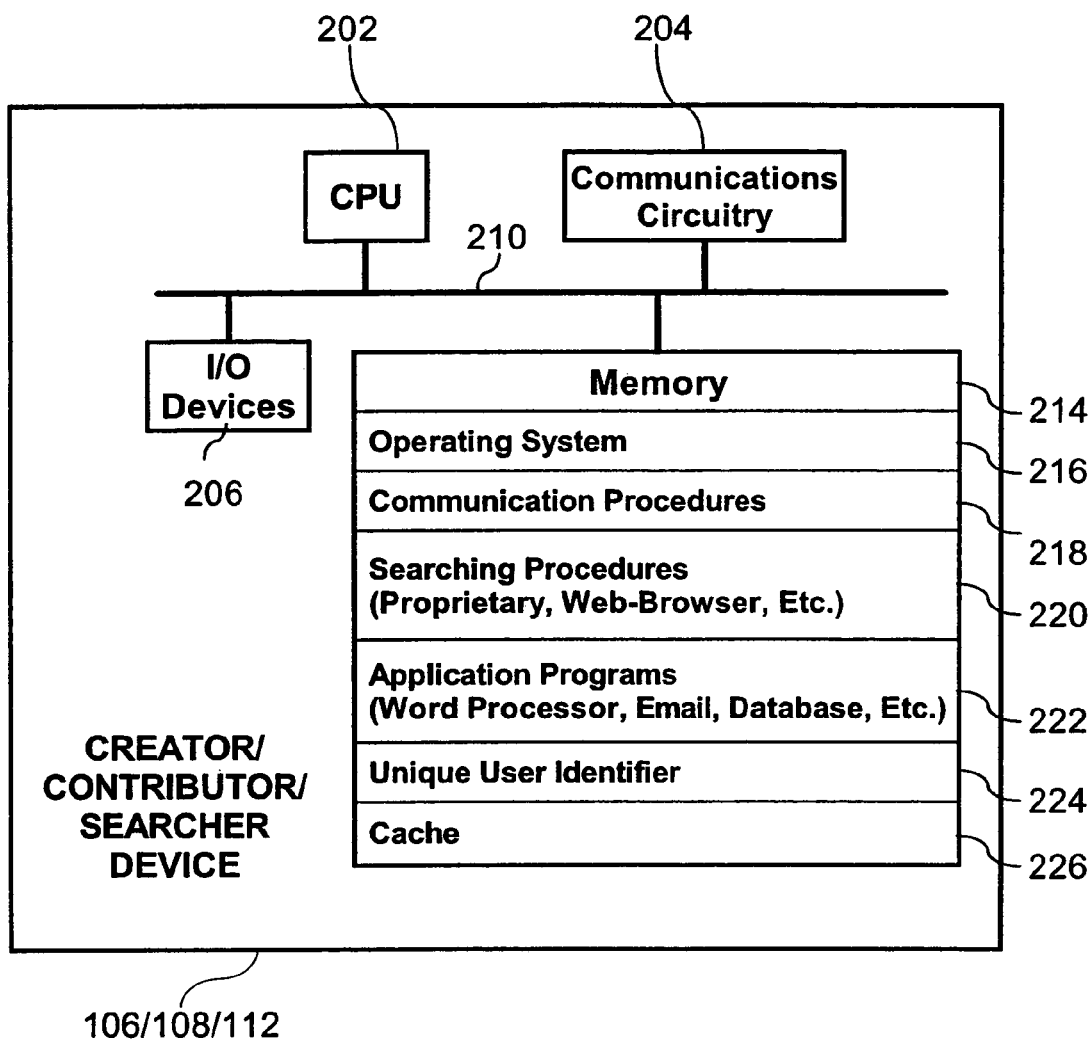
FIG. 2 is a block diagram of a creator device, contributor device, or searcher device, as shown in FIG. 1.

FIG. 2 is a block diagram of a creator device 106, contributor device 112, or searcher device 108, as shown in FIG. 1. The devices 106/108/112 preferably include the following cmponents: at least one data processor or central processing unit (CPU) 202; a memory 214; input and/or output devices 206, such as a monitor and keyboard; communications circuitry 204 for communicating with the network 110 (FIG. 1) and information retrieval system 102 (FIG. 1); and at least one bus 210 that interconnects these components.

Memory 214 preferably includes an operating system 216, such as but not limited to, VXWORKS™, LINUX™, or WINDOWS™ having instructions for processing, accessing, storing, or searching data, etc. Memory 214 also preferably includes communication procedures for communicating with the network 110 (FIG. 1) and information retrieval system 102 (FIG. 1); searching procedures 220, such as proprietary search software, a Web-browser, or the like; application programs 222, such as a word processor, email client, database, or the like; a unique user identifier 224; and a cache 226 for temporarily storing data. The unique user identifier 224 may be supplied by the creator/searcher/contributor each time he or she performs a search, such as by supplying a username. Alternatively, the unique user identifier 224 may be the user's login username, Media Access Control (MAC) address, Internet Protocol (IP) address, or the like.

Figure 3:
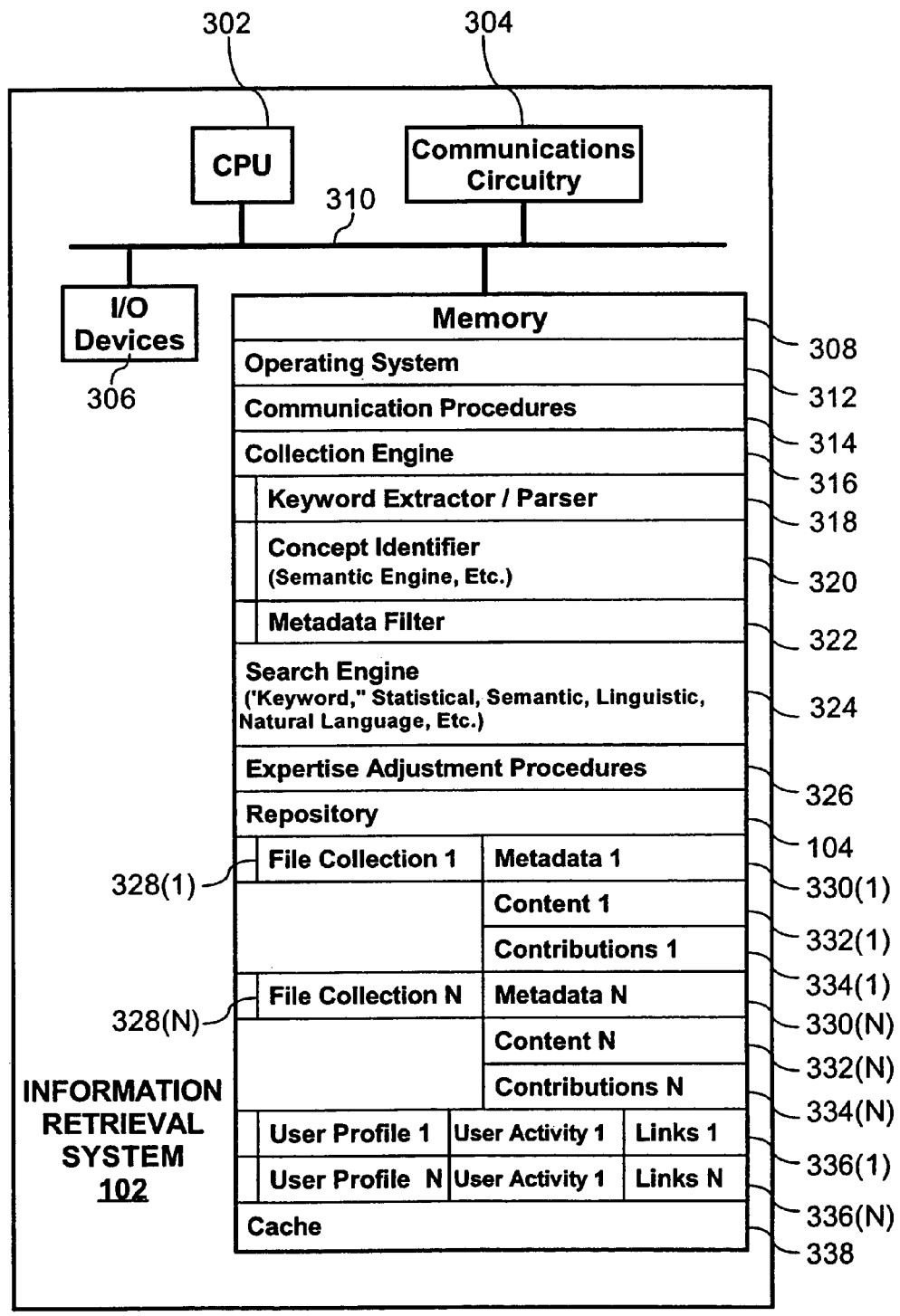
FIG. 3 is a block diagram of the information retrieval system and Repository of FIG. 1.

FIG. 3 is a block diagram of the information retrieval system 102 and Repository 104 of FIG. 1. As mentioned in relation to FIG. 1, the repository 104 is preferably contained within the information retrieval system 102. The information retrieval system 102 preferably includes the following components: at least one data processor or central processing unit (CPU) 302; a memory 308; input and/or output devices 306, such as a monitor and keyboard; communications circuitry 304 for communicating with the network 110 (FIG. 1), creator device/s 106 (FIG. 1), contributor device/s 112 (FIG. 1), and/or searcher device 108 (FIG. 1); and at least one bus 310 that interconnects these components.

Memory 308 preferably includes an operating system 312, such as but not limited to, VXWORKS™, LINUX™, or WINDOWS™ having instructions for processing, accessing, storing, or searching data, etc. Memory 308 also preferably includes communication procedures 314 for communicating with the network 110 (FIG. 1), creator device/s 106 (FIG. 1), contributor device/s 112 (FIG. 1), and/or searcher device 108 (FIG. 1); a collection engine 316 for receiving and storing documents; a search engine 324; expertise adjustment procedures 326; a repository 104, as shown in FIG. 1; and a cache 338 for temporarily storing data.

The collection engine 316 comprises a keyword extractor or parser 318 that extracts text and/or keywords from any suitable document, such as an ASCII or XML file, Portable Document Format (PDF) file, word processing file, or the like. The collection engine 316 also preferably comprises a concept identifier 320. The concept identifier 320 is used to extract the document's important concepts. The concept identifier may be a semantic, synaptic, or linguistic engine, or the like. In a preferred embodiment the concept identifier 320 is a semantic engine, such as TEXTANALYST™ made by MEGAPUTER INTELLIGENCE™ Inc. Furthermore, the collection engine 316 also preferably comprises a metadata filter 322 for filtering and/or refining the concept/s identified by the concept identifier 320. Once the metadata filter 322 has filtered and/or refined the concept, metadata about each document is stored in the repository 104. Further details of the processes performed by the collection engine 316 are discussed in relation to FIG. 4. In addition to refined concepts, metadata includes any data, other than raw content, associated with a document.

The search engine 324 is any standard search engine, such as a keyword search engine, statistical search engine, semantic search engine, linguistic search engine, natural language search engine, or the like. In a preferred embodiment, the search engine 324 is a semantic search engine.

The expertise adjustment procedures 326 are used to adjust an object's intrinsic score to an adjusted score based on the expertise of the searcher, creator/s, and/or contributors. The expertise adjustment procedures 326 are described in further detail below in relation to FIG. 5.

A file collection 328(1)–(N) is created in the repository 104 for each object input into the system, such as a document or source. Each file collection 328(1)–(N) preferably contains: metadata 330(1)–(N), such as associations between keywords, concepts, or the like; content 332(1)–(N), which is preferably ASCII or XML text or the content's original format; and contributions 334(1)–(N), such as contributor comments or the like. At a minimum, each file collection contains content 332(1)–(N). The repository 104 also contains user profiles 336(1)–(N) for each user, i.e., each searcher, creator, or contributor. Each user profile 336(1)–(N) includes associated user activity, such as which files a user has created, commented on, opened, printed, viewed, or the like, and links to various file collections 328(1)–(N)that the user has created or contributed to. Further details of use of the repository 104 are discussed in relation to FIG. 5.

Figure 4:
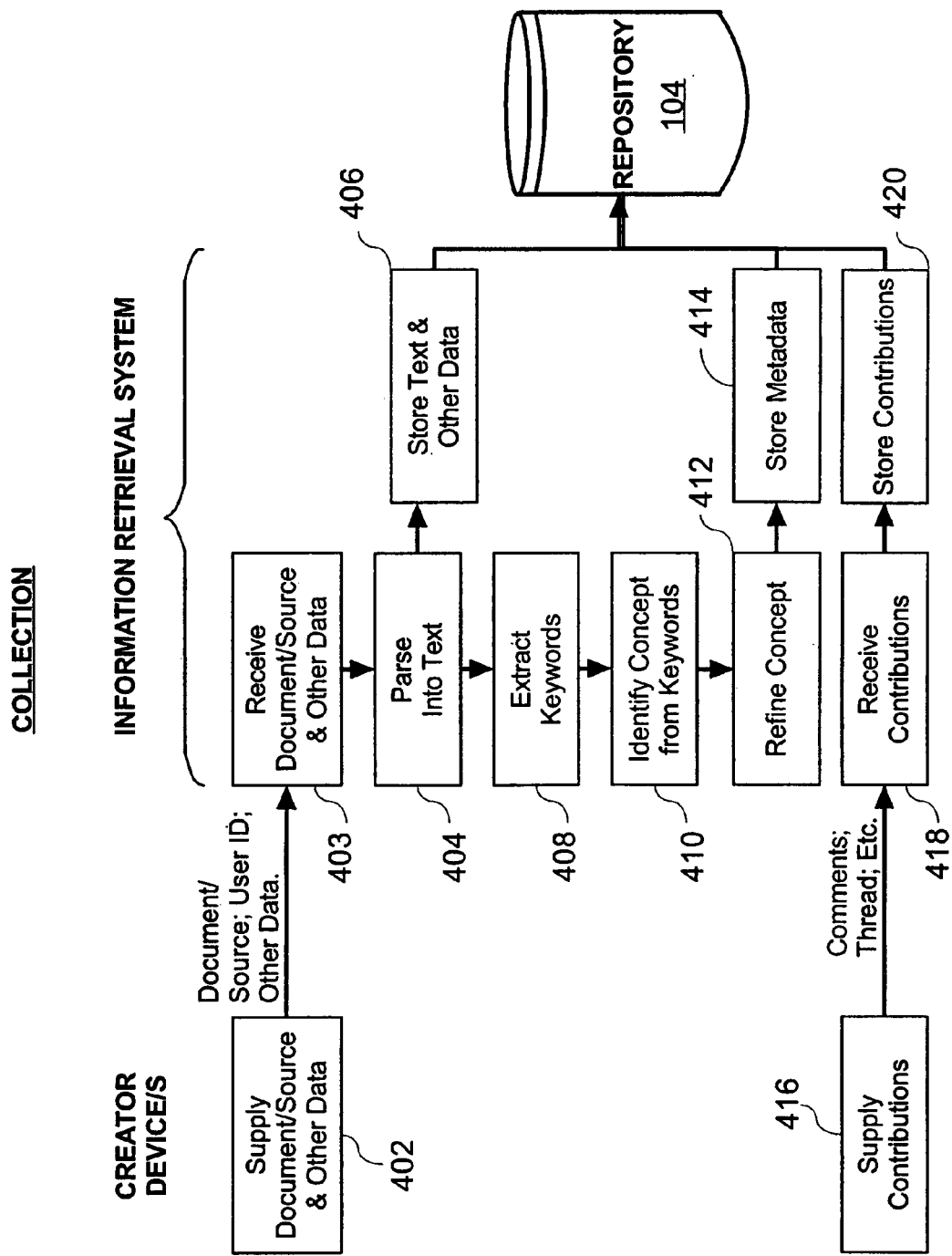
FIG. 4 is a flow chart of document collection according to an embodiment of the invention.

FIG. 4 is a flow chart of document collection according to an embodiment of the invention. A creator supplies an object, such as a document or source, to the searching procedures 220 (FIG. 2) at step 402. To supply a document, the creator may for example, supply any type of data file that contains text, such as an email, word processing document, text document, or the like. A document comes from a source of the document. Therefore, to supply a source, the creator may provide a link to a document, such as by providing a URL to a Web-page on the Internet, or supply a directory that contains multiple documents. In a preferred embodiment, the creator also supplies his or her unique user identifier 224 (FIG. 2), and any other data, such as privacy settings, or the like. The unique user identifier may be supplied without the creator's knowledge, such as by the creator device 106 (FIG. 1) automatically supplying its IP or MAC address.

The document, source, and/or other data is then sent to the information retrieval system 102 (FIG. 1) by the communication procedures 218 (FIG. 2). The information retrieval system 102 (FIG. 1) receives the document, source, and/or other data at step 403. When supplied with a document, the keyword extractor or parser 318 (FIG. 3) parses the document and/or source into ASCII text at step 404, and thereafter extracts the important keywords at step 408. However, when supplied with a source, the keyword extractor or parser 318 (FIG. 3) firstly obtains the document/s from the source before parsing the important keywords into text.

Extraction of important keywords is undertaken using any suitable technique. These keywords, document, source, and other data are then stored at step 406 as in the repository 104 as part of a file collection 328(1)–(N) (FIG. 3). Also, the unique user identifier is used to associate or link each file collection 328(1)–(N) (FIG. 3) created with a particular creator. This link between the creator and the file collection is stored in the creator's user profile 336(1)–(N) (FIG. 3). The user profile data can be updated by the user him/herself or more preferably by a system administrator.

In a preferred embodiment, the concept identifier 320 (FIG. 3) then identifies the important concept/s from the extracted keywords at step 410. Again, in a preferred embodiment, the metadata filter 322 (FIG. 3) then refines the concept at step 412. The refined concept is then stored in the repository 104 as part of the metadata 330(1)–(N) (FIG. 3) within a file collection 328(1)–(N) (FIG. 3).

At any time, contributors can supply their contributions, at step 416, such as additional comments, threads, or other activity to be associated with the file collection 328(1)–(N). These contributions are received by the information retrieval engine at step 418 and stored in the repository at step 420, as contributions 334(1)–(N). Alternatively, contributions may be received and treated in the same manner as a document/source, i.e., steps 403–414.

Figure 5:
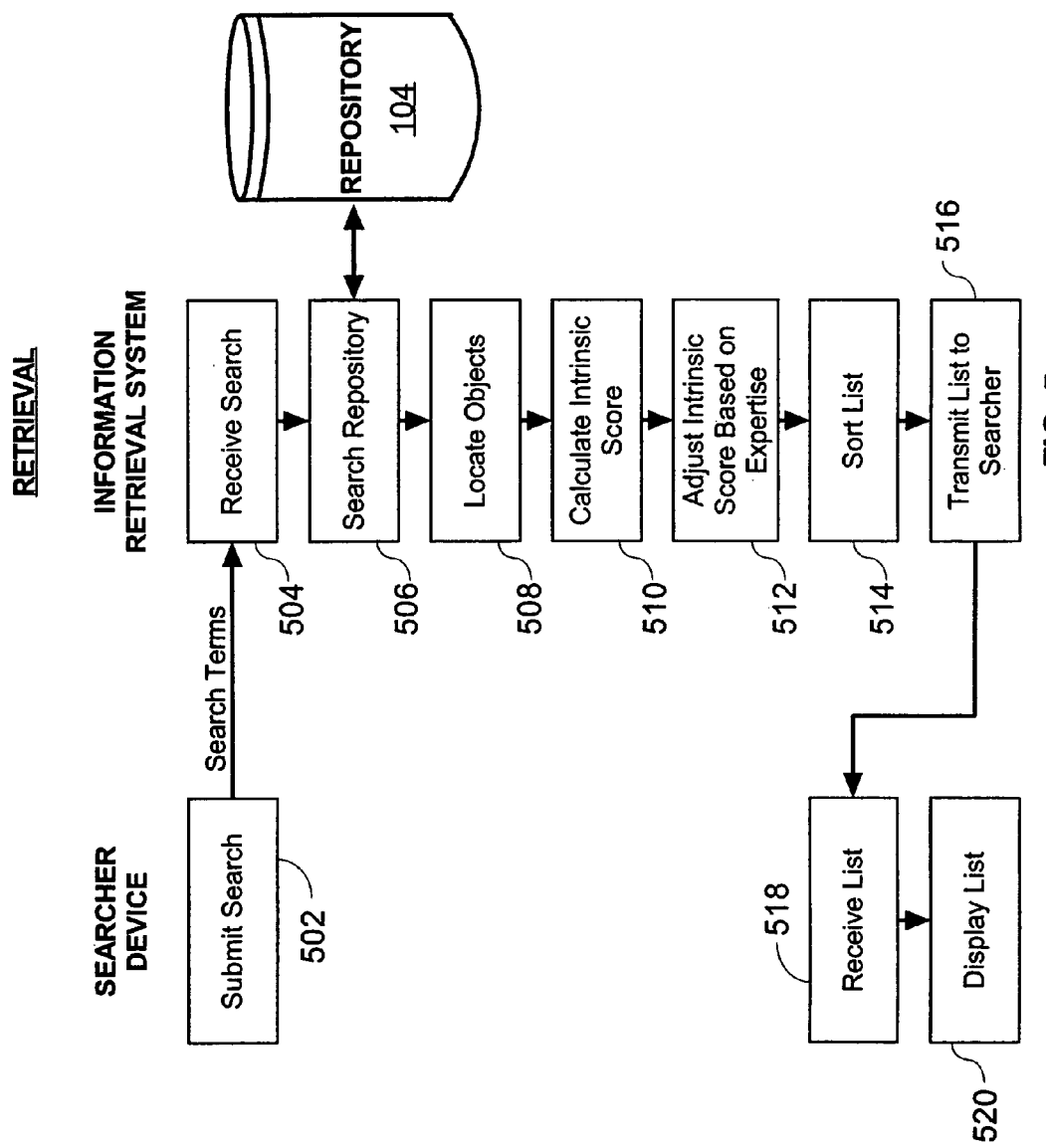
FIG. 5 is a flow chart of a process for information retrieval according to an embodiment of the invention.

FIG. 5 is a flow chart of a process for information retrieval according to an embodiment of the invention. A searcher using a searcher device 108 (FIG. 1) submits a search request to the information retrieval system 102 (FIG. 1), at step 502. Submittal of this search occurs using searching procedures 220 (FIG. 2) and communication procedures 218 (FIG. 2) on the searcher device 108 (FIG. 1). The search request preferably contains one or more search terms, and the unique user identifier 224 (FIG. 2) of the searcher.

The search is preferably conducted to locate objects. Objects preferably include: content objects, such as documents, comments, or folders; source objects; people objects, such as experts, peers, or workgroups; or the like. A search for documents returns a list of relevant documents, and a search for experts returns a list of experts with expertise in the relevant field. A search for sources returns a list of sources from where relevant documents were obtained. For example, multiple relevant documents may be stored within a particular directory or website.

The search is received at step 504 by the information retrieval system 102. (FIG. 1) using communications procedures 314 (FIG. 3). The information retrieval system 102 (FIG. 1) then searches the repository 104 for relevant objects at step 506. This search is undertaken by the search engine 324 (FIG. 3), at step 506, using any known or yet to be discovered search techniques. In a preferred embodiment, the search undertakes a semantic analysis of each file collection 328(1)–(N) stored in the repository 104.

The search engine 324 (FIG. 3) then locates relevant objects 328(1)–(N) at step 508 and calculates an intrinsic score at step 510 for each located object. By "located object," it is meant any part of a file collection that is found to be relevant, including the content, source, metadata, etc. Calculation of the intrinsic score is based on known, or yet to be discovered techniques for calculating relevancy of located objects based solely on the located objects themseves, the repository itself and the search terms. In its simplest form, such a search calculates the intrinsic score based on the number of times that a search term appears in the content 332(1)–(N) (FIG. 3) of located objects. However, in a preferred embodiment, this calculation is also based on a semantic analysis of the relationship between words in the content 332(1)–(N) (FIG. 3).

The intrinsic score is then adjusted to an adjusted score by the expertise adjustment procedures 326, at step 512. This adjustment takes the expertise of the creator/s, searcher, and/or contributor/s into account, as described in further detail below.

Once the intrinsic score has been adjusted to an adjusted score, a list of the located objects is sorted at step 514. The list may be sorted by any field, such as by adjusted score, intrinsic score, source, most recently viewed, creator expertise, etc. The list, preferably containing a brief record for each located object, is then transmitted to the searcher device 108 (FIG. 1) at step 516. Each record preferably contains the located object's adjusted score, creator, title, etc. The list is then received by the searcher device at step 518 and displayed to the searcher at step 520. In an alternative embodiment, sorting of the list is performed by the searching procedures 220 (FIG. 2) on the searcher device 108 (FIG. 1).

Preferred algorithms for adjusting the intrinsic score (step 512 of FIG. 5) will now be described. It should be appreciated that these algorithms are merely exemplary and in no way limit the invention other than as claimed. Calculation of the adjusted score from the intrinsic score is dependent on the objects searched for, such as documents, comments, sources, experts, or peers.

Expertise Adjustment when Searching for Documents

Search term(s) entered by the searcher may or may not be extended to form a query. Such possible extensions, include but are not limited to, synonyms or stemming of search term(s). Once the intrinsic score has been calculated according to step 510 above, the adjusted score (RS_ADJ) for each located document is calculated as follows:

$$RS\_ADJ = \text{Intrinsic Document Score} + \text{Expertise Adjustment} \quad (1)$$
$$= IDS + EA$$

where the Intrinsic Document Score (IDS) is a weighted average between a Document Content Score (DCS) and a Comments Content Score (CCS).

$$IDS = a*DCS + (1-a)*CCS \quad (2)$$

with "a" being a number between 0 and 1 and determining the importance of the content of a document relative to the content of its attached comments.

The DCS and CCS are calculated by any methodology or technique. Existing search engine algorithms may be used to fulfill this task. Also note that the DCS and CCS are not influenced by the searcher that entered the query. In this embodiment, the DCS and CCS can be any number between 2 and 100. The Expertise Adjustment (EA) is calculated as follows:

$$EA = DCE + CCE \quad (3)$$

where DCE is the Document Creator Expertise adjustment and CCE is the Comments Contributors Expertise adjustment. The DCE adjustment takes into account all activity performed by a given user and is computed as follows:

$$DCE = R1(DCS)*W1(RS\_EXP\_ABS) \quad (4)$$

where R1(DCS) determines the maximal amount of the expertise adjustment, or, in other words, the range for the alteration due to the expertise of the creator of the document. This depends on the level of the DCS. The range function is given by:

$$R1(DCS) = 20 * \left(1 - \frac{|DCS - 50|}{100}\right) \quad (5)$$

Extreme intrinsic scores, i.e., scores near 2 or 100, are less influenced than scores near the middle, i.e., scores near 50. The maximum possible change in a score is 20 when DCS=50 and linearly decreases to 10 when DCS=100 or 2.

W1(RS_EXP_ABS) determines what percentage of available range R1(DCS), positively or negatively, is considered for adjusting the intrinsic score. It is given by:

$$W1(RS\_EXP\_ABS) = \frac{RS\_EXP\_ABS(\text{Creator}) - RS\_EXP\_ABS(\text{Searcher})}{100} \quad (6)$$

where RS-EXP-ABS denotes the absolute relevance score of a user, that is, the user expertise, be it searcher expertise, creator expertise, or contributor expertise. The calculation of RS-EXP-ABS occurs as follows:

$$RS\text{-}EXP\text{-}ABS = 3 * F(\text{User contribution}) * \quad (7)$$
$$G(\text{Company expertise}) *$$
$$H(\text{Query specificity})$$

where F (User contribution) accounts for the relevancy of all contributions made by the user, considering all documents created, all comments contributed, and the user's definition of his or her folders within the software. These folders (private or public) constitute the user's personal taxonomy. G (Company expertise) accounts for the company expertise about the query, i.e., whether a few or most employees in a company have produced something relevant to the query. H (Query specificity) accounts for the specificity of the query within the repository, i.e., whether many or just a few file collections were created.

In detail:

$$F(\text{User cont.}) = \sum_{i:\text{allrelevant documents}} \left(2*(W_{i,\max} + C_i)*\left(\frac{(DCS)_i}{100}\right)^2\right) + \sum_{i:\text{allnonrelevant documents}} C_i + 2*\text{Taxonomy} \quad (8)$$

where the first sum is over all relevant documents and the second sum is over all non-relevant documents that possessed a relevant comment, i.e., the comment was relevant but not the document. $(DCS)_i$ is the Intrinsic document relevancy score attained for the i-th relevant document. Also, $W_{i,max}$, is the user activity measure. $C_i$ is calculated as follows:

$$C_i = 0.1*\left(1 - \text{Exp}\left(-\frac{\text{\# relevant comments in } Doc_i \text{ by this user}}{2}\right)\right) \quad (9)$$

and is the reward assigned to matching comments made on documents, relevant or not. A matched comment is not necessarily attached to a relevant document.

$W_{i,max}$ accounts for the type of contribution (such as but not limited to creation, commenting, or highlighting). In short, $W_{i,max}$ is the maximum of the following weights (if applicable).

$W_{i,edit}=1$ if the user created or edited i-th file collection, $W_{i,comment}=0.5*\text{Max}*(0.7-\text{Min}_{comments}*(\text{Level}))/6$ if the user commented on the i-th file collection. Since these comments are organized in a threaded discussion, the weight will also depend on how remote a comment is to the file collection itself. For example, a comment on a comment on a comment to the original file collection will receive a lesser weight than a comment on the original file collection. In the formula, Level measures how remote the comment is from the file collection. The least remote comment is taken into consideration as long as it is closer than six comments away from the parent file collection.

$W_{i,rename}=0.8$ if the user renamed i-th file collection.

$W_{i,highlight}=0.8$ if the user highlighted some subparts of i-th file collection.

$W_{i,link}=0.8$ if the user linked the file collection to another file collection or "external" URL.

$$\text{Taxonomy} = \begin{cases} 1 & \text{If Query term found within user's taxonomy} \\ 0 & \text{Otherwise} \end{cases}$$

The taxonomy in this preferred embodiment stands for folder names. Each user has built some part of the repository by naming folders, directories, or sub-directories. For example, creator 1 might have grouped his Hubble telescope pictures in a folder called "Space Images." Then term "Space Images" becomes part of the user's taxonomy.

Within an organization or enterprise, some of the taxonomy (folder structure) has been defined by the organization or enterprise itself and has "no owners." In this case, each folder has an administrator who bestows rights to users, such as the right to access the folder, the right to edit any documents within it, the right to edit only documents that the specific user created, or the right to view but not edit or contribute any document to the folder. Only the names of the folders that a user creates are part of his or her taxonomy.

$$G(\text{Company expertise}) = 1 + \text{Log}\left(\frac{P}{E}\right) = IEF, \quad (10)$$

where Log is the logarithmic function base 10; P is the total number of users; and E is the number of relevant experts. The number of relevant experts is calculated by determining how many unique creators and contributors either created or contributed to the located documents. IEF stands for Inverse Expertise Frequency.

This adjustment raises the adjusted scores when there are few relevant experts within the company.

$$H(\text{Query specificity}) = 1 + \frac{1}{\text{Log}(NCO)} \text{Log}\left(\frac{NCO}{NCOR}\right) \quad (11)$$

$$= 2 - \frac{\text{Log}(NCOR)}{\text{Log}(NCO)} = IWCOF$$

where Log is the logarithmic function base 10; NCO is the total number of content objects available in the database at the time of the query; and NCOR is the total number of relevant content objects for a given query. IWCOF stands for the Inverse Weighted Content Objects Frequency. Preferably, in this embodiment, NCO, NCOR and IWCOF are only calculated using non-confidential content objects.

IWCOF is similar to IEF as it adjusts the score by slightly raising the adjusted score when only a few relevant content objects are found in the database. Therefore, the absolute relevance score for a given user (or the user expertise) is:

$$RS\text{-EXP-ABS} = 3*\left(1 + \text{Log}\left(\frac{P}{E}\right)\right)\left(2 - \frac{\text{Log}(NCOR)}{\text{Log}(NCO)}\right)* \quad (12)$$

$$\left(\sum_{i:\text{allrelevant documents}} \left(2*\left(w_{i,\max} + C_i\right)*\left(\frac{(DCS)_i}{100}\right)^2\right) + \sum_{i:\text{allnonrelevant documents}} C_i + 2*\text{Taxonomy}\right)$$

$$= 3*IEF*IWCOF*$$

$$\left(\sum_{i:\text{allrelevant documents}} \left(2*\left(w_{i,\max} + C_i\right)*\left(\frac{(DCS)_i}{100}\right)^2\right) + \sum_{i:\text{allnonrelevant documents}} C_i + 2*\text{Taxonomy}\right)$$

Using the above equations, the intrinsic score is increased to an adjusted score if the creator of the content objects is more knowledgeable about the searched subject matter than the person that entered the query, ie., if the creator expertise is higher than the searcher expertise. On the other hand, the intrinsic score is decreased to an adjusted score if the creator is less knowledgeable about the searched subject matter than the searcher, i.e., if the creator expertise is lower than the searcher expertise.

To calculate the Comments Contributors Expertise Adjustment (CCE) the following equation is used:

$$CCE = 5 * \left(2 * \frac{\text{Exp}(Dx)}{1 + \text{Exp}(Dx)} - 1\right) \quad (13)$$

where $$\Delta x = \frac{1}{50} \sum_{\text{DistinctContributors}} (RS\_EXP\_ABS(\text{Contributors}) - RS\_EXP\_ABS(\text{Searcher})) \quad (14)$$

Once these adjustments have been computed, one has to ensure that the relevancy score from (1) is in the appropriate range and that it is preferably in this embodiment an integer. This is obtained as follows:

$$RS\_ADJ = \text{Min}(100, \text{Max}(1, \text{Round}(RS\_ADJ))) \quad (15)$$

where Round(d) rounds the number d to its nearest integer.

Expertise Adjustment when Searching for Sources

Once the intrinsic score has been calculated according to step 510 above, the adjusted score for sources (RSS_ADJ) for each source is calculated as follows:

$$RSS\_ADJ = \text{intrinsic Source Content score} + \text{expertise adjustment} \quad (16)$$
$$= SCS + R2(SCS) * W2(RS\_EXP\_ABS)$$

where SCS is the intrinsic Source Content Score computed, which is, preferably in this embodiment, defined here as the maximum of all the intrinsic Document Content Scores (DCS) that were created from each source, i.e., $$SCS = \text{MAX}(DCS) \quad (17)$$

For example, multiple documents may have been saved as multiple file collections from a single Web-site.

R2(SCS) determines the maximal amount of the expertise adjustment, or, in other words, the range for the alteration due to the expertise of the creator of the document taken from the source, which depends on the level of the intrinsic source score, i.e., SCS. The range function is given by:

$$R1(SCS) = 20 * \left(1 - \frac{|SCS - 50|}{100}\right) \quad (18)$$

Extreme scores are less influenced than scores in the middle. The maximum possible change in a score is 20 when SCS=50 and linearly decreases to 10 when SCS=100 or 2.

W2(RS_EXP_ABS) determines what percentage of available range for the expertise adjustment, R2(SCS), positively or negatively, is considered for building the scoring. It is given by:

$$W2(RS\_EXP\_ABS) = \frac{\text{MAX}(RS\_EXP\_ABS(\text{Creator})) - RS\_EXP\_ABS(\text{Searcher})}{100} \quad (19)$$

where RS_EXP_ABS is the absolute relevance score of the expert (as defined previously). MAX(RS_EXP_ABS(Creator)) is the maximum of absolute expertise scores over all creators that have created file collections from this source. RS_EXP_ABS(Searcher) is the absolute relevance score of the searcher. In other words, the intrinsic score for the source is adjusted upward to an adjusted score if the maximum creator expertise of all creators for a particular source exceeds the searcher expertise. On the other hand, the intrinsic score for the source is lowered to an adjusted score if the creator expertise of all creators for a particular source is lower than the searcher expertise.

Once this adjustment has been computed, one has to ensure that the relevancy score is in the appropriate range and that it is preferably in this embodiment an integer. This is obtained as follows:

$$RSS\_ADJ = \text{Min}(100, \text{Max}(1, \text{Round}(RSS\_ADJ))) \quad (20)$$

where Round(d) rounds the number d to its nearest integer.

In this way, the adjusted score for each document (RS_ADJ) or the adjusted score for sources (RSS_ADJ) is calculated based on the expertise of the searcher, creator/s, and/or contributor/s. Such adjusted scores provide a significant improvement in precision over that attainable through conventional information retrieval systems.

Expertise Adjustment when Searching for Peers

When users are looking for peers rather than experts an adjusted relevancy score is calculated. Peers are other users that have a similar expertise or come from a similar, or the same, department as the searcher. The adjusted relevancy score uses the expertise values and adjusts them with respect to the searcher's expertise. This is the similar to resorting the list with respect to the searcher, but instead recalculates the values themselves.

Once the expertise for each user has been determined, they are adjusted with respect to the searcher expertise. The adjusted relative or personalized relevancy score for an expert is defined by:

$$\text{Adjusted } Rel = 100 - 10 * |(\sqrt{RS\text{-}EXP\text{-}ABS} - \sqrt{RS\text{-}EXP\text{-}ABS}_{\text{searcher}} + 10)| \quad (21)$$

The adjusted relevancy score is a measure of the difference between two levels of expertise. The square root maps the difference to a continuous and monotone measure while diminishing the importance of differences when two experts are far apart. It is also asymmetric in the sense that it favors expertise above the searcher expertise. Finally, recall that |K| represents the absolute value of K (i.e., the difference).

An example of a method for personalizing information retrieval using the above formulae will now be described. It should, however, be appreciated that this example is described herein merely for ease of explanation, and in no way limits the invention to the scenario described. Table 1 sets out the environment in which a search is conducted. Furthermore, in this illustration, the factor a (from formula 2, determining the importance of the content of a document relative to its attached comments) has been arbitrarily set to 1.

TABLE 1

| Number of users | # experts |
|---|---|
| 100 | 10 |

| Total Number of File Collections | # of relevant File Collections | # of relevant comments |
|---|---|---|
| 1000 | 10 | 10 |

| Departments of experts | Names |
|---|---|
| Marketing | Adam M. |
| | Bryan M. |
| | Christie M. |
| | David M. |
| Engineering | Eric E. |
| | Fred E. |
| | Gail E. |
| Finance | Hugo F. |
| | Henry F. |
| Legal | Ivan L. |

| File Collection number | Creator | Contributors (total # of contributions, # of relevant contributions) |
|---|---|---|
| 11 | Adam M. | Bryan M. (2, 2) |
| | | Christie M. (1, 0) |
| 101 | Adam M. | |
| 201 | David M. | David M. (2) |
| | | Hugo F. (3) |
| 301 | David M. | David M. (1) |
| 401 | Christie M. | Adam M. (1) |
| | | Christie M. (3, 1) |
| | | David M. (1) |
| | | Eric E. (2) |
| | | Fred E. (2, 2) |
| | | Hugo F. (3) |
| | | Ivan L. (5) |
| 501 | Gail E. | Eric E. (1, 0) |
| | | Fred E. (5, 0) |
| | | Gail E. (4, 0) |
| 601 | Eric E. | |
| 701 | Henry F. | Henry F. (6, 0) |
| | | Hugo F. (7, 1) |
| | | Bryan M. (1, 1) |
| 801 | Hugo F. | |
| 901 | Ivan L. | Henry F. (1, 0) |
| 999 | John I. | Bryan M. (2, 2) |
| | | Fred E. (3, 1) |

| File Collection Intrinsic score | | Attached comments intrinsic score, by author |
|---|---|---|
| File Collection number | DCS score | CCS scores |
| 11 | 85 | Bryan M., 1 |
| | | Bryan M., 1 |
| | | Christie M., 0 |
| 101 | 85 | |
| 201 | 100 | David M., 0 |
| | | Hugo F. 0 |
| 301 | 50 | David M., 0 |
| 401 | 75 | Adam M., 0 |
| | | Christie M., 1 |
| | | David M., 0 |

TABLE 1-continued

| | | Eric E., 0 |
|---|---|---|
| | | Fred E., 1 |
| | | Fred E. 1 |
| | | Hugo F., 0 |
| | | Ivan L., 0 |
| 501 | 80 | Eric E., 0 |
| | | Fred E., 0 |
| | | Gail E., 0 |
| 601 | 80 | |
| 701 | 40 | Henry F., 0 |
| | | Hugo F., 1 |
| | | Hugo F., 0 |
| | | Bryan M., 1 |
| 801 | 60 | |
| 901 | 70 | Henry F., 0 |
| 999 | 0 | Byran M., 1 |
| | | Bryan M., 1 |
| | | Fred E., 1 |
| | | Fred E., 0 |

| Taxonomy matches |
|---|
| Christie M. |
| Bryan M. |

| File Collection number | Original source | |
|---|---|---|
| 11 | cnn.com | The source name here is |
| 101 | nytimes.com | truncated to the "root level" for |
| 201 | microsoft.com | simplification purposes. In reality |
| 301 | bbc.com | it is the entire url tag. For example, |
| 401 | nytimes.com | http://www.cnn.com/2002/WORLD/ |
| 501 | cnn.com | meast/03/26/arab.league/index.html |
| 601 | nytimes.com | |
| 701 | latimes.com | |
| 801 | bbc.com | |
| 901 | corporate intranet | |

For this example, 100 users having a total number of 1000 file collections in the repository yields 10 experts and 10 relevant file collections. There are also 10 comments that are found to be relevant. The enterprise in which the example takes place has four departments, namely marketing, engineering, finance, and legal. For ease of explanation, each employee's last name begins with the department in which they work.

Once the repository 104 (FIG. 1) has been searched (step 506—FIG. 5) and all relevant documents located (step 508—FIG. 5), an Intrinsic Document Score (IDS) is calculated for each located document. This score is a weighted average between a Document Content Score (DCS) and a Comment Content Score (CCS). The DCS and CCS are calculated using any standard search engine techniques. CCS is the Comment Content Score calculated by any means such as semantic engine, frequency of words, etc.

Using formulae 7–12 above, the expertise of each searcher, creator, and/or contributor is then calculated. The calculations for F(User contribution) yield the results in Table 2 below.

TABLE 2

| User | File Collection | $W_i$ by File collection | $C_i$ by File collection | First sum in formula Details | Value | Second sum in formula | Taxonomy match |
|---|---|---|---|---|---|---|---|
| Adam M. | 11 | 1 | 0 | 2 * 1 * (85/100)^2 | 1.445 | 0 | |
| | 101 | 1 | 0 | 2 * 1 * (85/100)^2 | 1.445 | 0 | 0 |
| F(Adam M.) | | 2.89 | | | | | |
| Bryan M. | 11 | 0.5 | 0.063 | 2 * (0.5 + 0.063) * (.85)^2 | 0.814 | 0 | |
| | 701 | 0.5 | 0.039 | 2 * (0.5 + 0.039) * (.4)^2 | 0.172 | 0 | |
| | 999 | 0.5 | 0.063 | 2 * (0.5 + 0.063) * 0 | 0 | 0.063 | 2 |
| F(Bryan M.) | | 3.049 | | | | | |
| Christie M. | 401 | 1 | 0.039 | 2 * (1 + 0.039) * (75/100)^2 | 1.169 | 0.039 | 2 |
| F(Christie M.) | | 3.208 | | | | | |
| David M. | 201 | 1 | 0 | 2 * 1 * 1 | 2 | 0 | |
| | 301 | 1 | 0 | 2 * 1 * (0.5)^2 | 0.5 | 0 | 0 |
| F(David M.) | | 2.5 | | | | | |
| Eric E. | 601 | 1 | 0 | 2 * 1 * (.8)^2 | 1.28 | 0 | 0 |
| F(Eric E.) | | 1.28 | | | | | |
| Fred E. | 401 | 0.5 | 0.063 | 2 * (0.5 + 0.063) * .75^2 | 0.633 | | |
| | 999 | 0.5 | 0.039 | 2 * (0.5 + 0.039) * 0 | 0 | 0.039 | 0 |
| F(Fred E.) | | 0.672 | | | | | |
| Gail E. | 501 | 1 | 0 | 2 * 1 * .8^2 | 1.28 | 0 | 0 |
| F(Gail E.) | | 1.28 | | | | | |
| Hugo F. | 801 | 1 | 0 | 2 * 1 * .6^2 | 0.72 | 0 | 0 |
| F(Hugo F.) | | 0.72 | | | | | |
| Ivan L. | 901 | 1 | 0 | 2 * 1 * .7^2 | 0.98 | 0 | 0 |
| F(Ivan L.) | | 0.98 | | | | | |

Using formulae 10 and 11, G(Company Expertise) is calculated to be 2 while H(Query Specificity) is calculated to be 1.667. These values and the values in Table 2 are plugged into formula 7 to arrive at the following expertise values:

TABLE 3

| Name | RS-EXP-ABS |
|---|---|
| Adam M. | 29 |
| Bryan M. | 30 |
| Christie M. | 32 |
| David M. | 25 |
| Eric E. | 13 |
| Fred E. | 7 |

TABLE 3-continued

| Name | RS-EXP-ABS |
|---|---|
| Gail E. | 13 |
| Hugo F. | 7 |
| Henry F. | 3 |
| Ivan L. | 10 |

W1(RS_EXP_ABS) is then calculated using formula 6 (for different searcher expertises) to yield the following results:

TABLE 4

| | W(RS_EXP_ABS) | | | | | | | | | |
|---|---|---|---|---|---|---|---|---|---|---|
| | Searcher Expertise | | | | | | | | | |
| Name | 0 | 5 | 10 | 15 | 20 | 25 | 30 | 35 | 40 | 45 |
| Adam M. | 0.29 | 0.24 | 0.19 | 0.14 | 0.09 | 0.04 | −0.01 | −0.06 | −0.11 | −0.16 |
| Bryan M. | 0.3 | 0.25 | 0.2 | 0.15 | 0.1 | 0.05 | 0 | −0.05 | −0.1 | −0.15 |
| Christie M. | 0.32 | 0.27 | 0.22 | 0.17 | 0.12 | 0.07 | 0.02 | −0.03 | −0.08 | −0.13 |
| David M. | 0.25 | 0.2 | 0.15 | 0.1 | 0.05 | 0 | −0.05 | −0.1 | −0.15 | −0.2 |
| Eric E. | 0.13 | 0.08 | 0.03 | −0.02 | −0.07 | −0.12 | −0.17 | −0.22 | −0.27 | −0.32 |
| Fred E. | 0.07 | 0.02 | −0.03 | −0.08 | −0.13 | −0.18 | −0.23 | −0.28 | −0.33 | −0.38 |
| Gail E. | 0.13 | 0.08 | 0.03 | −0.02 | −0.07 | −0.12 | −0.17 | −0.22 | −0.27 | −0.32 |
| Hugo F. | 0.07 | 0.02 | −0.03 | −0.08 | −0.13 | −0.18 | −0.23 | −0.28 | −0.33 | −0.38 |
| Henry F. | 0.03 | −0.02 | −0.07 | −0.12 | −0.17 | −0.22 | −0.27 | −0.32 | −0.37 | −0.42 |
| Ivan L. | 0.1 | 0.05 | 0 | −0.05 | −0.1 | −0.15 | −0.2 | −0.25 | −0.3 | −0.35 |

DCE and CCE are then calculated using formulae 4, 5, 13, and 14 (for different searcher expertises) to yield the following results:

TABLE 5

DCE Calculations

| File collection ID | R1 | W(searcher exp = 0) | DCE (0) |
|---|---|---|---|
| 11 | 13 | 0.29 | 3.77 |
| 101 | 13 | 0.29 | 3.77 |
| 201 | 10 | 0.25 | 2.5 |
| 301 | 20 | 0.25 | 5 |
| 401 | 15 | 0.32 | 4.8 |
| 501 | 14 | 0.13 | 1.82 |
| 601 | 14 | 0.13 | 1.82 |
| 701 | 18 | 0.03 | 0.54 |
| 801 | 18 | 0.07 | 1.26 |
| 901 | 16 | 0.1 | 1.6 |

| File collection ID | R1 | W(searcher exp = 30) | DCE (30) |
|---|---|---|---|
| 11 | 13 | −0.01 | −0.13 |
| 101 | 13 | −0.01 | −0.13 |
| 201 | 10 | −0.05 | −0.5 |
| 301 | 20 | −0.05 | −1 |
| 401 | 15 | 0.02 | 0.3 |
| 501 | 14 | −0.17 | −2.38 |
| 601 | 14 | −0.17 | −2.38 |
| 701 | 18 | −0.27 | −4.86 |
| 801 | 18 | −0.23 | −4.14 |
| 901 | 16 | −0.2 | −3.2 |

CCE Calculations

| File collection ID | "Delta X" or Dx Searcher Exp = 0 | Searcher Exp = 30 | CCE (0) | CCE(30) |
|---|---|---|---|---|
| 11 | 1.24 | 0.04 | 2.76 | 0.1 |
| 101 | 0 | 0 | 0 | 0 |
| 201 | 0.64 | −0.56 | 1.55 | −1.36 |
| 301 | 0.5 | −0.1 | 1.22 | −0.25 |
| 401 | 2.46 | −1.74 | 4.21 | −3.51 |
| 501 | 0.66 | −1.14 | 1.59 | −2.58 |
| 601 | 0 | 0 | 0 | 0 |
| 701 | 0.8 | −1 | 1.9 | −2.31 |
| 801 | 0 | 0 | 0 | 0 |
| 901 | 0.06 | −0.54 | 0.15 | −1.32 |

The Expertise Adjustment (EA) is then calculated according to formula 3 to yield the following results for EA:

TABLE 6

| Expertise Adjustment (EA) | Values for DCE and CCE are from Table 5 above | |
|---|---|---|
| File collection ID | Searcher expertise = 0 | Searcher expertise = 30 |
| 11 | 6.53 | −0.03 |
| 101 | 3.77 | −0.13 |
| 201 | 4.05 | −1.86 |
| 301 | 6.22 | −1.25 |
| 401 | 9.01 | −3.21 |
| 501 | 3.41 | −4.96 |
| 601 | 1.82 | −2.38 |
| 701 | 2.44 | −7.17 |
| 801 | 1.26 | −4.14 |
| 901 | 1.75 | −4.52 |
| | This entry is DCE + CCE when the searcher expertise is 0 | This entry is DCE + CCE when the searcher expertise is 30 |

Finally, the adjusted score (RS_ADJ) for each located document is calculated using formula 1 to yield the following results:

TABLE 7

| File collection ID | Document Intrinsic score | RS_ADJ Adjusted score Searcher exp = 0 | RS_ADJ Adjusted score Searcher exp = 30 |
|---|---|---|---|
| 11 | 85 | 92 | 85 |
| 101 | 85 | 89 | 85 |
| 201 | 100 | 100 | 98 |
| 301 | 50 | 56 | 49 |
| 401 | 75 | 84 | 72 |
| 501 | 80 | 83 | 75 |
| 601 | 80 | 82 | 78 |
| 701 | 40 | 42 | 33 |
| 801 | 60 | 61 | 56 |
| 901 | 70 | 72 | 65 |

In a similar manner, the adjusted scores are calculated when searching for sources as per tables 8–12 below.

TABLE 8

| Source name | File collection created from source | Creators of File collections |
|---|---|---|
| cnn.com | 11, 501 | Adam M., Gail E. |
| microsoft.com | 201 | David M. |
| nytimes.com | 101, 401, 601 | Adam M., Christie M., Eric E. |
| bbc.com | 801 | Hugo F. |
| latimes.com | 701 | Henry F. |
| corporate intranet | 901 | Ivan L. |

TABLE 9

SCS calculations

| Source | SCS |
|---|---|
| cnn.com | 85 |
| microsoft.com | 100 |
| nytimes.com | 85 |
| bbc.com | 60 |
| latimes.com | 40 |
| corporate intranet | 70 |

TABLE 10

R2 calculations

| cnn.com | 13 |
|---|---|
| microsoft.com | 10 |
| nytimes.com | 13 |
| bbc.com | 18 |
| latimes.com | 18 |
| corporate intranet | 16 |

TABLE 11

W2 Calculations

| | Searcher Expertise = 0 | Searcher Expertise = 30 |
|---|---|---|
| cnn.com | 0.29 | −0.01 |
| microsoft.com | 0.25 | −0.05 |
| nytimes.com | 0.32 | 0.02 |
| bbc.com | 0.07 | −0.23 |
| latimes.com | 0.03 | −0.27 |
| corporate intranet | 0.1 | −0.2 |

TABLE 12

Adjusted relevancy scores

| Source name | RSS_ADJ Searcher Expertise = 0 | RSS_ADJ Searcher Expertise = 30 | SCS Intrinsic score |
|---|---|---|---|
| cnn.com | 89 | 85 | 85 |
| microsoft.com | 100 | 100 | 100 |
| nytimes.com | 89 | 85 | 85 |
| bbc.com | 61 | 56 | 60 |
| latimes.com | 41 | 35 | 40 |
| corporate intranet | 72 | 67 | 70 |

As can be seen the intrinsic scores of each document and/or source is adjusted to an adjusted score based on the expertise of the users. In other words, a document and/or source that may have been less relevant, is adjusted so that it is more relevant, or visa versa. In this way, the precision of document and/or source relevancy is improved.

While the foregoing description and drawings represent preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A computer implemented method for personalizing information retrieval, comprising:
   receiving at an information retrieval system a search request from a searcher, where said search request contains at least one search term;
   searching a plurality of objects based on said at least one search term;
   finding at least one located object from said plurality of objects, where said at least one located object is associated with said at least one search term;
   calculating an intrinsic score for said at least one located object, where said intrinsic score is based on said at least one search term;
   adjusting said intrinsic score to an adjusted score based on at least one of a creator expertise of a creator of said at least one located object, a contributor expertise of a contributor to said at least one located object, and a searcher expertise of said searcher; and
   transmitting a list to said searcher, where said list comprises said at least one located object and said adjusted score for said at least one located object.

2. The method of claim 1, wherein said search request identifies said searcher through a unique user identifier.

3. The method of claim 2, wherein said plurality of objects include content objects, source objects, or people objects.

4. The method of claim 5, wherein said adjusting further comprises lowering said intrinsic score to said adjusted score for each located content object or source object having a creator expertise that is lower than said searcher expertise.

5. The method of claim 1, wherein said at least one located object includes multiple objects selected from a group consisting of: content objects, source objects, and people objects.

6. The method of claim 5, wherein said adjusting further comprises raising said intrinsic score to said adjusted score for each located content or source object having a creator expertise higher than said searcher expertise.

7. The method of claim 5, wherein said adjusting further comprises:
   locating objects associated with said searcher using said unique user identifier;
   ascertaining said searcher expertise based on said at least one search term and said objects associated with said searcher;
   determining said creator expertise and said contributor expertise for each located object;
   raising said intrinsic score to said adjusted score for each located content object or source object having a creator expertise higher than said searcher expertise;
   lowering said intrinsic score to said adjusted score for each located content object or source object having a creator expertise that is lower than said searcher expertise; and
   changing said intrinsic score to said adjusted score for each located people object according to said searcher and creator expertise.

8. The method of claim 5, wherein said adjusting comprises:
   ascertaining said searcher expertise based on said search terms and any objects associated with said searcher;
   determining at least one of said creator expertise and said contributor expertise for each located content or source object;
   raising said intrinsic score to said adjusted score for each located content or source object having a creator expertise higher than said searcher expertise;
   lowering said intrinsic score to said adjusted score for each located object having a creator expertise that is lower than said searcher expertise; and
   changing said intrinsic score to said adjusted score for each located people object according to said searcher and creator expertise.

9. The method of claim 5, wherein said searcher expertise is dependent on the sum of the intrinsic scores of all located objects created by said searcher.

10. The method of claim 1, wherein said searching is undertaken using a search technique selected from a group consisting of: semantic processing, syntactic processing, natural language processing, statistical processing, and any combination of the aforementioned techniques.

11. The method of claim 1, wherein said searcher expertise is dependent on the sum of all non-relevant objects of said plurality of objects not created by said searcher but containing relevant comments of said searcher.

12. The method of claim 1, wherein said searcher expertise is dependent on the sum of all non-relevant objects of said plurality of objects created by said searcher but containing relevant comments of said searcher.

13. The method of claim 1, wherein said searcher expertise is dependent on the total number of users relative to the total number of relevant users.

14. The method of claim 1, wherein said searcher expertise is dependent on the total number of objects of said plurality of objects relative to the total number of relevant objects of said plurality of objects.

15. The method of claim 1, wherein said searcher expertise is dependent on the searcher's taxonomy.

16. The method of claim 1, wherein said searcher expertise is dependent on whether the searcher created, edited, commented on, renamed, highlighted, linked, printed, copied or any activity that is monitored in a log file, said at least one located object.

17. The method of claim 1, wherein said creator expertise is dependent on the sum of the intrinsic scores of all located objects created by said creator.

18. The method of claim 1, wherein said creator expertise is dependent on the sum of all non-relevant objects of said plurality of objects not created by said creator but containing relevant comments of said creator.

19. The method of claim 1, wherein said creator expertise is dependent on the sum of all non-relevant objects of said plurality of objects created by said creator but containing relevant comments of said creator.

20. The method of claim 1, wherein said creator expertise is dependent on the total number of users relative to the total number of relevant users.

21. The method of claim 1, wherein said creator expertise is dependent on the total number of objects of said plurality of objects relative to the total number of relevant objects of said plurality of objects.

22. The method of claim 1, wherein said creator expertise is dependent on a creator's taxonomy.

23. The method of claim 1, wherein said creator expertise is dependent on whether the creator created, edited, commented on, renamed, highlighted, or linked, printed, copied or any activity that is monitored in a log file, said at least one located object.

24. The method of claim 1, wherein said contributor expertise is dependent on the sum of the intrinsic scores of all located objects created by said contributor.

25. The method of claim 1, wherein said contributor expertise is dependent on the sum of all non-relevant objects of said plurality of objects not created by said contributor but containing relevant comments of said contributor.

26. The method of claim 1, wherein said contributor expertise is dependent on the sum of all non-relevant objects of said plurality of objects created by said contributor but containing relevant comments of said contributor.

27. The method of claim 1, wherein said contributor expertise is dependent on the total number of users relative to the total number of relevant users.

28. The method of claim 1, wherein said contributor expertise is dependent on the total number of objects of said plurality of objects relative to the total number of relevant objects of said plurality of objects in the repository.

29. The method of claim 1, wherein said contributor expertise is dependent on the contributor's taxonomy.

30. The method of claim 1, wherein said contributor expertise is dependent on the whether the contributor created, edited, commented on, renamed, highlighted, linked, printed, copied or any activity that is monitored in a log file, said at least one located object.

31. The method of claim 1, further comprising, prior to said transmitting, sorting said list based on adjusted score.

32. The method of claim 1, wherein said transmitting comprises sending a list of people objects and their associated adjusted scores to said searcher.

33. The method of claim 1, wherein said transmitting comprises sending a list of source objects and their associated adjusted scores to said searcher.

34. A computer program product for personalizing information retrieval, the computer program product comprising a computer readable storage and a computer program stored therein, the computer program comprising:
   instructions for receiving at an information retrieval system a search request from a searcher, where said search request contains at least one search term;
   instructions for searching a plurality of objects based on said at least one search term;
   instructions for finding at least one located object from said plurality of objects, where said at least one located object is associated with said at least one search term;
   instructions for calculating an intrinsic score for said at least one located object, where said intrinsic score is based on said at least one search term;
   instructions for adjusting said intrinsic score to an adjusted score based on at least one of a creator expertise of a creator of said at least one located object, a contributor expertise of a contributor to said at least one located object, and a searcher expertise of said searcher; and
   instructions for transmitting a list to said searcher, where said list comprises said at least one located object and said adjusted score.

35. The computer program product of claim 34, wherein said computer program further comprises:
   instructions for ascertaining said searcher expertise based on said search terms and any objects associated with said searcher;
   instructions for determining said at least one of said creator expertise and said contributor expertise for said at least one located object;
   instructions for raising said intrinsic score to said adjusted score for each located content or source object having a creator expertise higher than said searcher expertise; and
   instructions for lowering said intrinsic score to said adjusted score for each located content or source object having a creator expertise that is lower than said searcher expertise.

36. A system for personalizing information retrieval comprising:
   at least one searcher device, creator device, and contributor device coupled to a network;
   a repository containing one or more objects; and
   an information retrieval system comprising:
      a Central Processing Unit (CPU); and
      a memory comprising:
      instructions for receiving at an information retrieval system a search request from a searcher, where said search request contains at least one search term;
      instructions for searching a plurality of objects based on said at least one search term;
      instructions for finding at least one located object from said plurality of objects, where said at least one located object is associated with said at least one search term;
      instructions for calculating an intrinsic score for said at least one located object, where said intrinsic score is based on said at least one search term;
      instructions for adjusting said intrinsic score to an adjusted score based on at least one of a creator expertise of a creator of said at least one located object, a contributor expertise of a contributor to said at least one located object, and a searcher expertise of said searcher; and instructions for transmitting a list to said searcher, where said list comprises said at least one located object and said adjusted score.

37. The system of claim 36, wherein said memory further comprises:
  instructions for ascertaining said searcher expertise based on said search terms and any objects associated with said searcher;
  instructions for determining said at least one of said creator expertise and said contributor expertise for said at least one located object;
  instructions for raising said intrinsic score to said adjusted score for each located content or source object having a creator expertise higher than said searcher expertise; and
  instructions for lowering said intrinsic score to said adjusted score for each located content or source object having a creator expertise that is lower than said searcher expertise.

* * * * *